United States Patent [19]

Murray

[11] Patent Number: 4,730,552
[45] Date of Patent: Mar. 15, 1988

[54] VENT ASSEMBLY

[76] Inventor: Michael J. Murray, Pialba Caravan Park, Esplanade, Pialba, Australia, QLD 4655

[21] Appl. No.: 869,722

[22] Filed: Jun. 2, 1986

[30] Foreign Application Priority Data

Jun. 3, 1985 [AU] Australia .............................. PH00866

[51] Int. Cl.⁴ ............................................... B60H 1/26
[52] U.S. Cl. .......................................... 98/37; 98/2.14; 98/42.14; 98/42.16; 98/74
[58] Field of Search ..................... 98/2.14, 13, 20, 37, 98/42.16, 74, 77, 42.14

[56] References Cited

U.S. PATENT DOCUMENTS

| 470,568 | 3/1892 | Hodel | 98/74 |
| 471,388 | 3/1892 | Keys | 98/77 |
| 789,627 | 5/1905 | Pullman | 98/74 X |
| 2,084,787 | 6/1937 | Zaustinsky | 98/2.14 |
| 4,038,911 | 8/1977 | Hart | 98/2.14 |

FOREIGN PATENT DOCUMENTS 740150  1/1933  France .................... 98/74

Primary Examiner—Harold Joyce
Attorney, Agent, or Firm—Murray and Whisenhunt

[57] ABSTRACT

A ventilating skylight including a housing having a top wall and a pair of opposed sidewalls extending downwardly from the top wall to respective roof mountings so that the housing may be fixed to a roof at opposite sides of a roof skylight opening. The housing includes front and rear openings through which sunlight may pass to the skylight opening, and a transparent or translucent dividing wall assembly is provided having front and rear portions which extend upwardly and inwardly from the front and rear openings and form the base wall of an air flow passage extending between the front and rear openings. An intermediate vent opening is provided in the base wall assembly which communicates with the flow passage for directing air flow to the skylight opening. A water trap arrangement is associated with the vent opening for obstructing rain water passing along the base wall towards the vent opening. Closure flaps are provided for closing the front and rear ends of the flow passage, with each closure flap being pivotable between an open position in which the flap does not obstruct air flow through the respective opening and a closed position in which the flap extends across the respective opening. The closure flaps are biased to an open position and are movable to the closed position by aerodynamic forces.

10 Claims, 4 Drawing Figures

VENT ASSEMBLY

This invention relates to a vent assembly.

In particular this invention relates to a vent assembly which may be supported on a roof or wall to provide ventilation through the roof or wall. The vent assembly may be used for example to provide ventilation to a dwelling, office or factory. However for illustrative purposes particular reference will be made hereinafter to its application to caravans.

Caravans are frequently provided with roof openings above which various types of hatches are supported to provide ventilation for the caravan. These may be of the type comprising a rigid hatch provided with elevating means whereby the hatch may be raised to provide an opening through which air may flow or lowered to close the roof opening. Another popular type of hatch adapted to take advantage of the prevailing wind comprises a fixed square hatch provided with separately operable flaps along each side which may be selectively opened to admit air from any one side. Both the above types of hatches are relatively complex and inefficient in use. Furthermore, both types will allow rain to enter the caravan if left open. In addition these types of hatches are not adapted to admit sunlight into the interior of the caravan.

This invention aims to alleviate the above and other disadvantages associated with the presently available ventilators and to provide a vent assembly which will be reliable and efficient in use. Other objects and advantages of this invention will hereinafter become apparent.

With the foregoing and other objects in view, this invention in one aspect resides broadly in a vent assembly for ventilating a space through an aperture in a roof or wall or the like, including: a flow passage having open ends through which wind may flow; a vent opening intermediate said open ends operatively connectible to said aperture, and independently operable closure means for closing each said open end. Preferably there is provided trap means in the flow passage to prevent rain water entering the vent opening and this may include base wall portions of said flow passage which inclines upwardly from said open ends to said vent opening.

The flow passage may extend past said vent opening in such manner as to create, in use, a low pressure zone at said vent opening. The closure flaps may be manually controllable to regulate the air flow through said vent opening and/or they may be so formed as to move automatically to a closed position at a selected wind velocity. Suitably this is achieved by forming the closure flaps to a shape upon which wind will act to move the flap to the closed position. Alternatively wind pressure sensing means and suitable actuating means may be used to close the flaps at a desired wind velocity. It is also preferred that the inclined base wall of said flow passage be formed of transparent material such as glass or a plastics material and that said closure flaps be formed of a sun filtering material such as transparent coloured plastics material. The vent opening may be provided with a mesh screen or the like to prevent passage of insects therethrough.

In order that this invention may be more readily understood and put into practical effect, reference will now be made to the accompanying drawings which illustrate a preferred embodiment of the invention, wherein.

Figure 1:
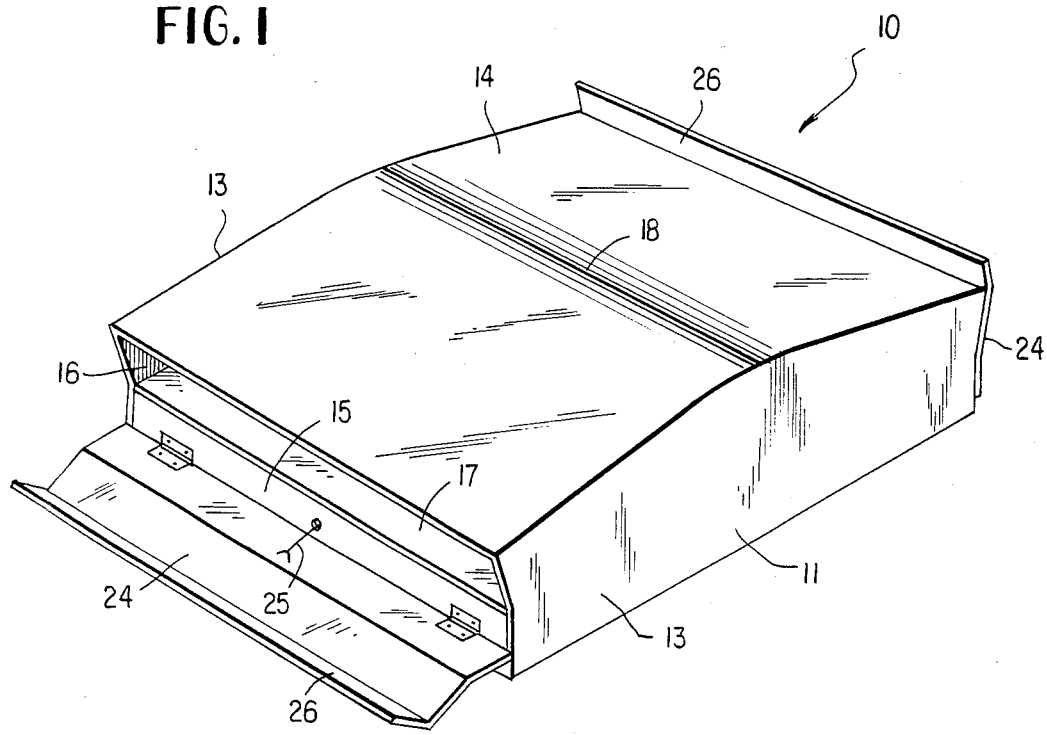
FIG. 1 is a perspective view of a vent assembly.
Figure 2:
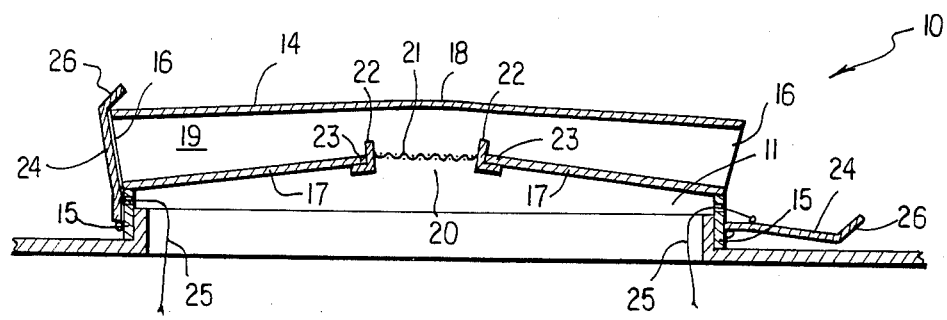
FIG. 2 is a cross-sectional view of the vent assembly illustrated in FIG. 1.

As shown in FIGS. 1 and 2, the vent assembly 10 is in the form of an open bottomed rectangular housing 11 which may be placed about a roof opening 12 to provide ventilation therethrough, either by forcing air through the opening 12 or by extracting air through the opening 12, as desired.

The housing 11 comprises a pair of side walls 13 which extend upwardly to the top wall 14 and opposed end walls 15 which terminate in spaced relationship with the top wall 14 so as to form opposed inlet/outlet openings 16.

Clear glass panels 17 extend upwardly and inwardly from the top edges of the end walls 15. These panels 17 converge with the respective adjacent portions of the top wall 14, which is also inclined upwardly towards a central portion 18, but at less inclination to form a venturi shaped flow passage 19 extending between the openings 16. The glass panels 17 terminate in spaced relationship with one another so as to form a vent opening 20 therebetween. This opening 20 is suitably covered by a clip-in insect screen 21 which may be removed and replaced through the open base of the vent assembly 10. Transversely extending flanges 22, are provided to support the spaced edges 23 of the glass panels 17. The flanges 22 extend upwardly beyond the panels 17 to provide a flow barrier to any water which may flow upwardly along panels 17 to the upper edges 23 thereof. Of course most of the water entering the opening 16 will flow down the panels 17 and directly across their lower edges.

A hinged closure flap 24 is supported on each end wall 15 and respective internally accessible operating cables 25 are provided to enable these flaps to be lifted to and held in their closed positions across the openings 16. Additionally, extension portions or sails 26 extend away from the outer edges of the flaps 24 such that when open, the sails 26 extend upwardly to catch the wind, whereby at a preselected wind velocity a respective closure flap 24 will be lifted by the wind to its closed position across the upwind opening 26. This will prevent driving rain from entering the opening 12. If desired the operating cables 25 may be elastic and may be pre-tensioned to assist the sails 26 to lift the flaps 24 to their closed positions whereby the wind velocity required to close the flaps may be readily adjusted by varying the cable tension.

The top wall 14 above each opening 16 overhangs the end walls 15 so as to direct run-off water away from the passage 19 and to prevent the flaps 24 from moving to a stable vertical position. Thus each flap will be biased to an open position and will fall open automatically when the cable 25 is released, provided the flaps 24 are not held closed by wind pressure. Rod or compression chain type operating mechanisms may be provided to enable the flaps to be operated and held in any desired position.

In use, both flaps 24 may be opened to permit air to flow through the flow passage 19. As the latter is venturi shaped, this will cause a reduced pressure zone adjacent the vent opening 20 with resultant extraction of air through the roof opening 12. Alternatively, the cable 25 may be pulled to close the flap 24 at the outlet end of the passage 19 to cause air to be forced downwardly through the screen 21 and the roof opening 12. If either or both flaps are open and a storm commences or the caravan to which the vent 10 is fitted moves, the flap 24 at the upwind opening will close automatically by wind force on the sail 26 to prevent high speed wind and/or rain from entering the passage 19. However ventilation may still be provided through the downwind opening 16.

For use in caravans, the vent assembly 10 has minimal top wall overhangs so that sunlight may be admitted through the open vent assembly 10. If desired of course overhangs can be eliminated and the top walls could be cutaway or be transparent to enhance this feature. However the top wall 14 is preferably opaque and its inside face is suitably treated, such as by being coloured white, to reflect as much light as possible through the glass panels 17 and through the roof opening 12. The closure flaps 24 may be formed of transparent or coloured plastics material to form a sun filter when closed. Furthermore the housing walls may be profiled to seat upon a sloping roof or the like such as a caravan roof and flap rest means may be fixed to the walls of the housing to support the flap in an open position from which they may be raised by wind force to their closed position.

Figure 3:
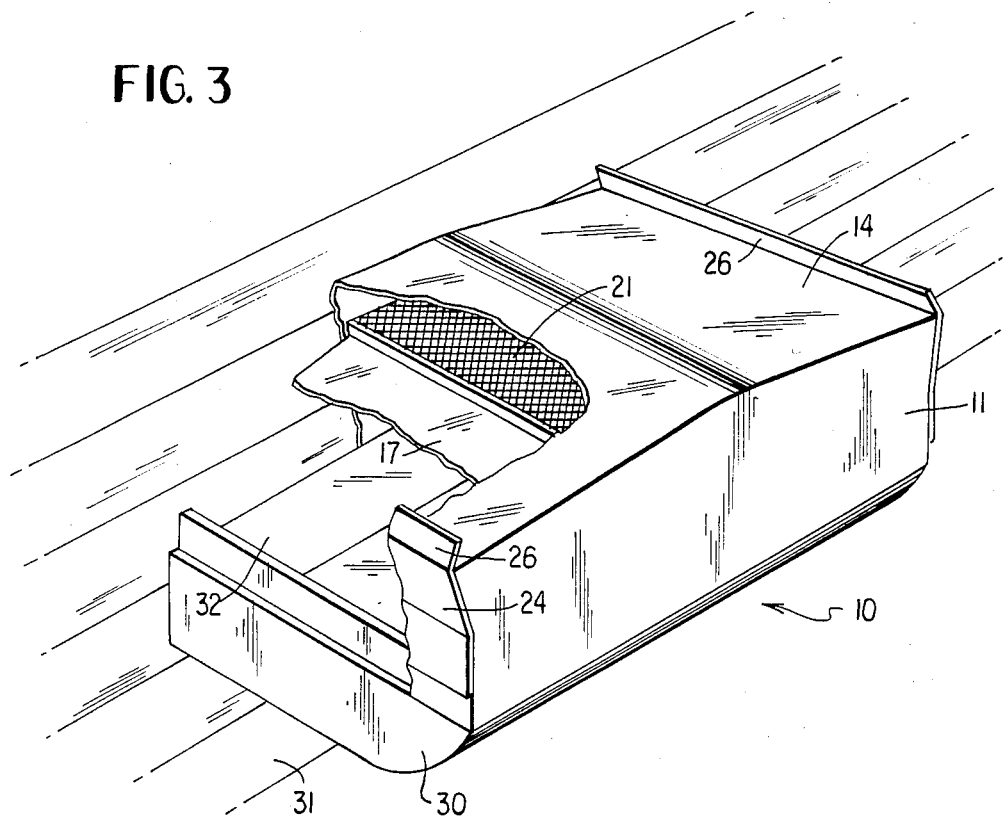
FIG. 3 is a cutaway view of a wall mounted vent assembly.
Figure 4:
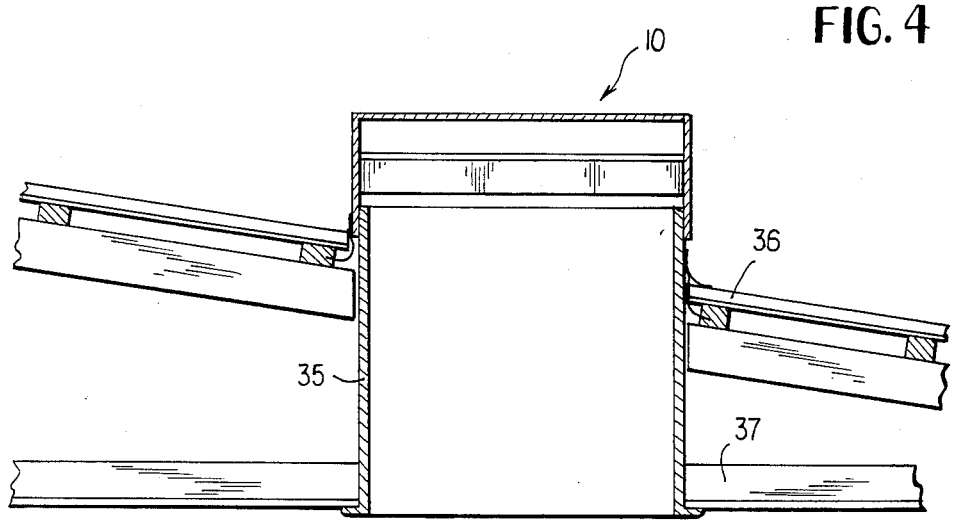
FIG. 4 is a cross-sectional view illustrating a roof mounted vent assembly.

The vent assembly 10 illustrated in FIGS. 1 and 2 can also be used for through wall ventilation on the roof of a house or the like. As shown in FIG. 3, through wall ventilation may be achieved by supporting the vent assembly 10 on an open topped plenum chamber 30 extending outwardly from an exterior building wall 31, the latter being apertured at 32 to permit air to be forced into or extracted from the building. In a roof installation, as shown in FIG. 4, the vent assembly 10 is supported on the upper end of a duct 35 which extends through the roof 36 and the ceiling structure to form a ventilation passage through which the vent assembly 10 can communicate with the interior of the building.

Of course for use on fixed structures or caravans if desired, the vent assembly can be formed without closure flaps or a mesh screen covering the ventilating opening. The top wall overhangs may be increased so as to prevent water passing into the passage 19 and the lower passage wall 17 can be made of opaque material. Furthermore inlet/outlet openings could be provided along both opposed pairs of sides of the housing and associated closure flaps could be provided on all openings. Alternatively the vent assembly of the present invention could be provided with only one inlet opening and or associated closure flap and be used only to force air through roof opening or the like.

However it is to be understood that while the above has been given by way of illustrative example of the present invention, all such modifications and variations thereto as would be apparent to persons skilled in the art are deemed to fall within the broad scope and ambit of this invention as is defined in the appended claims.

I claim:

1. A ventilating skylight, comprising:

a housing having a top wall and a pair of opposed sidewalls extending downwardly from said top wall of respective roof mountings for fixing said housing to a roof at opposite sides of a roof skylight opening;

front and rear openings in said housing through which sunlight may pass to said skylight opening;

a transparent or translucent dividing wall assembly having front and rear portions extending upwardly and inwardly from said front and rear openings and forming a base wall of an air flow passage extending between said front and rear openings, said flow passage having front and rear ends;

an intermediate vent opening in said base wall assembly communicating with said air flow passage for directing air flow to said skylight opening;

water trap means associated with the vent opening for obstructing rain water passing along said base wall towards said vent opening;

respective closure flaps for closing said front and rear ends of said flow passage, each said closure flap being pivotable between an open position in which said flap does not obstruct air flow through the respective said opening in said housing and a closed position in which said flap extends across the respective said opening in said housing, said closure flaps being biased to an open position and being movable to said closed position by aerodynamic forces.

2. A ventilating skylight according to claim 1, wherein said closure flaps are pivotally connected to respective lower edges of said front and rear openings whereby they are gravitationally biased to said open positions.

3. A ventilating skylight according to claim 2, wherein the free ends of said closure flaps have flanges extending upwardly into the air flow through said flow passage when in said open position, and provide said aerodynamic forces which lift said closure flaps to said closed position.

4. A ventilating skylight according to claim 3, wherein said top wall is opaque.

5. A ventilating skylight according to claim 4, wherein said top wall overhangs said front and rear openings.

6. A ventilating skylight according to claim 4, wherein said flow passage extends outwardly towards said front and rear openings from said vent opening.

7. A ventilating skylight according to claim 6, wherein said vent opening is provided with a removable insect screen.

8. A ventilating skylight according to claim 6, wherein said closure flaps are formed from transparent or translucent material.

9. A ventilating skylight according to claim 3, wherein said closure flaps are provided with manually operable closure means.

10. A ventilating skylight according to claim 3, wherein said closure flaps are independently pivotable between said closed and open positions.

* * * * *